US008249079B2

(12) United States Patent
Srivastava et al.

(10) Patent No.: US 8,249,079 B2
(45) Date of Patent: Aug. 21, 2012

(54) METHOD AND SYSTEM FOR CACHING IP NETWORK TOPOLOGY

(75) Inventors: Manoj Srivastava, Ellicott City, MD (US); Michael D. Taldo, Eldersburg, MD (US)

(73) Assignee: CA, Inc., Islandia, NY (US)

( * ) Notice: Subject to any disclaimer, the term of this patent is extended or adjusted under 35 U.S.C. 154(b) by 336 days.

(21) Appl. No.: 12/473,795

(22) Filed: May 28, 2009

(65) Prior Publication Data

US 2010/0303080 A1    Dec. 2, 2010

(51) Int. Cl.
*H04L 12/56* (2006.01)
(52) U.S. Cl. .................................. 370/395.31
(58) Field of Classification Search .............. 370/389, 370/395.31, 400
See application file for complete search history.

(56) References Cited

U.S. PATENT DOCUMENTS

| | | | | |
|---|---|---|---|---|
| 6,611,231 B2* | 8/2003 | Crilly et al. | .............. | 342/378 |
| 2008/0109548 A1* | 5/2008 | Okada et al. | .............. | 709/224 |
| 2009/0003354 A1* | 1/2009 | Sreejith et al. | .............. | 370/396 |
| 2009/0067439 A1* | 3/2009 | Yamamoto et al. | .......... | 370/400 |
| 2010/0023722 A1* | 1/2010 | Tabbara et al. | .............. | 711/170 |

* cited by examiner

*Primary Examiner* — Dang Ton
*Assistant Examiner* — Kevin Lee
(74) *Attorney, Agent, or Firm* — Baker Botts L.L.P.

(57) ABSTRACT

In accordance with one embodiment of the present disclosure, a system for caching network traffic includes an interface configured to receive traffic from a plurality of nodes communicating in a network, a processor coupled to the interface and configured to identify each of the plurality of nodes communicating in the network, and a database. The database includes a node object dimension table that includes an entry for each identified node. Each entry in the node object dimension table includes a node identification and an address for locating the node in the network. The database also includes a communication fact table that includes an entry for each communication in the network. Each entry in the communication fact table includes a source node identification that includes the node identification for the source node, a communication identification, and a destination node identification that includes the node identification for the destination node.

16 Claims, 4 Drawing Sheets

METHOD AND SYSTEM FOR CACHING IP NETWORK TOPOLOGY

TECHNICAL FIELD

This disclosure relates in general to communication networks and more particularly to a method and system for caching Internet Protocol (IP) network topology.

Overview

With the increasing size, speed, and dynamic nature of Internet Protocol (IP) networks, knowledge of current network topology and traffic patterns may be necessary for certain network discovery applications used for network security, network management, and performance management. Known techniques for monitoring network communications and topology create relationship fields between various network entities discovered in a packet. A many-to-many relationship exists between such network entities. Thus, discovery of a high-speed network may result in the creation of numerous relationships in a short period of time. Accordingly, known discovery tools for collecting and processing packets at high speeds may be overwhelmed by large packet flow rates.

SUMMARY OF EXAMPLE EMBODIMENTS

In accordance with one embodiment of the present disclosure, a system for caching network traffic includes an interface configured to receive traffic from a plurality of nodes communicating in a network. The system also includes a processor coupled to the interface and configured to identify each of the plurality of nodes communicating in the network. The system further includes a database. The database includes a node object dimension table. The node object dimension table includes an entry for each identified node, and each entry in the node object dimension table includes a node identification and an address for locating the node in the network. The database also includes a communication fact table. The communication fact table includes an entry for each communication in the network, and each entry in the communication fact table includes a source node identification, a communication identification, and a destination node identification. The source node identification includes the node identification for the source node. The destination node identification includes the node identification for the destination node.

Numerous technical advantages are provided according to various embodiments of the present disclosure. In certain embodiments, data redundancy associated with monitoring the topology of a network may be reduced or eliminated by maintaining information regarding previously discovered network entities. As such, recreating relationships among entities may be avoided, thus reducing unnecessary packet processing. In further embodiments, additional data regarding the time of discovery of nodes and communications may be maintained. As such, more data may be available.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE DRAWINGS

Figure 1:
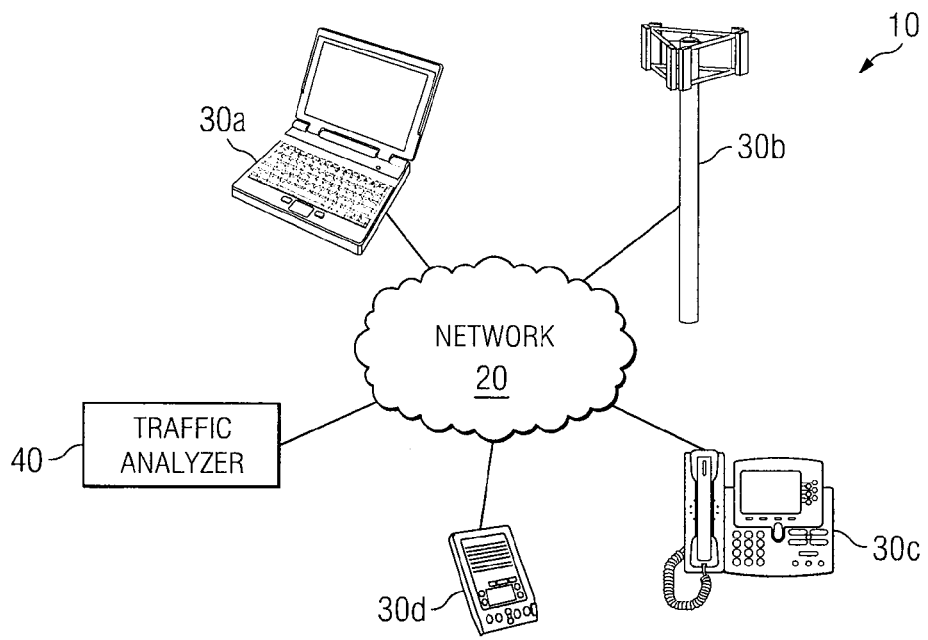
FIG. 1 is a simplified block diagram of an embodiment of a communication system for transmitting and receiving data.

FIG. 1 is a simplified block diagram of an embodiment of a communication system 10 for transmitting and receiving data. Included within communication system 10 is a network 20 that may support data transmission between nodes 30a-30d. Also included in within communication system 10 is a traffic analyzer 40. Embodiments of traffic analyzer 40 may support one or more network discovery applications used for network security, network management, and/or performance management.

Network 20 represents communication equipment, including hardware and any appropriate controlling logic, for interconnecting elements coupled to network 20. Network 20 may generally be any communication network capable of transmitting audio and/or video telecommunication signals, data, and/or messages. In certain embodiments, network 20 may comprise all or a portion of a radio access network; a public switched telephone network (PSTN); a public or private data network; a local area network (LAN); a metropolitan area network (MAN); a wide area network (WAN); a local, regional, or global communication or computer network such as the Internet; a wireline or wireless network; an enterprise intranet; or any combination of the preceding. Embodiments of network 20 may include any hardware and/or software configured to communicate information in the form of packets, cells, frames, segments or other portions of data. To facilitate such capabilities, network 20 may include one or more routers, hubs, switches, gateways, call controllers, or any other suitable components in any suitable form or arrangement.

Communications over network 20 may employ any suitable communication protocol. In particular embodiments, network 20 may utilize communication protocols that allow for the addressing or identification of nodes, and/or other components coupled to the communication network. For example, using Internet protocol (IP), each of the components coupled together by, network 20 may be identified in information directed using IP addresses. In this manner, network 20 may support any form and/or combination of point-to-point, multicast, unicast, or other techniques for exchanging media packets among components in communication system 10. It should be noted that while network 20 is illustrated as a single communication network, network 20 may comprise any number or configuration of networks. Moreover, communication system 10 may include any number or configuration of networks 20.

Nodes 30 represent devices that may support the communication of voice, video, text or other forms of data. To provide the recited functionality, nodes 30 may include any suitable combination of software, encoded logic, and/or hardware including one or more processors, memories, interfaces or other suitable devices. Additionally, nodes 30 may include one or more microphones, loudspeakers, user interfaces, or displays. Examples of nodes 30 may include IP phones; cell phones; personal digital assistants (PDAs); laptop computers; desktop computers; or any other device or component capable of facilitating voice or data exchanges within communication system 10. While FIG. 1 illustrates a particular number and configuration of nodes 30, communication system 10 contemplates any number or arrangement of such components to support the communication of media.

Nodes 30 may connect to a communication network, such as network 20, in any suitable way. For instance, a connection might be made through a fixed broadband connection such as a digital subscriber line (DSL), cable modem, or Ethernet. Wireless access to network 20 may be initiated through a wireless local access network (WLAN), worldwide interoperability for microwave access (WiMAX), or wireless fidelity (Wi-Fi) access point. Further, mobile access may be permitted using code division multiple access (CDMA), CDMA2000, general packet radio service (GPRS), universal mobile telecommunications system (UMTS), evolution-data optimized (EV-DO), and/or any other suitable mobile standard or technology.

Traffic Analyzer 40 may generally represent a data aggregation point within a network or an enterprise. Examples of traffic analyzer 40 may include a network center, data center hub, or other device having visibility to communications within a network. In operation, traffic analyzer 40 may receive and analyze network traffic to provide a real-time topology of network 20. The network topology may include a knowledgebase of network communications. For purposes of this specification, a communication may be a communication between two nodes in a network using a particular network protocol. Traffic analyzer 40 may capture such communications as a communication fact since they represent events that have occurred. As will be described below, various other quantitative and qualitative measures about the communication may be captured as part of the fact, such as, for example, the packet volume involved in the communication, the nodes participating in the communication, and the discovery time of the communication.

It should be noted that modifications, additions, or omissions may be made to communication system 10. Additionally, while the embodiment of communication system 10 illustrated in FIG. 1 includes particular components that are each configured to provide certain functionality, alternative embodiments may include any appropriate combination of components with the described functionality divided between the components in any suitable manner.

Figure 2:
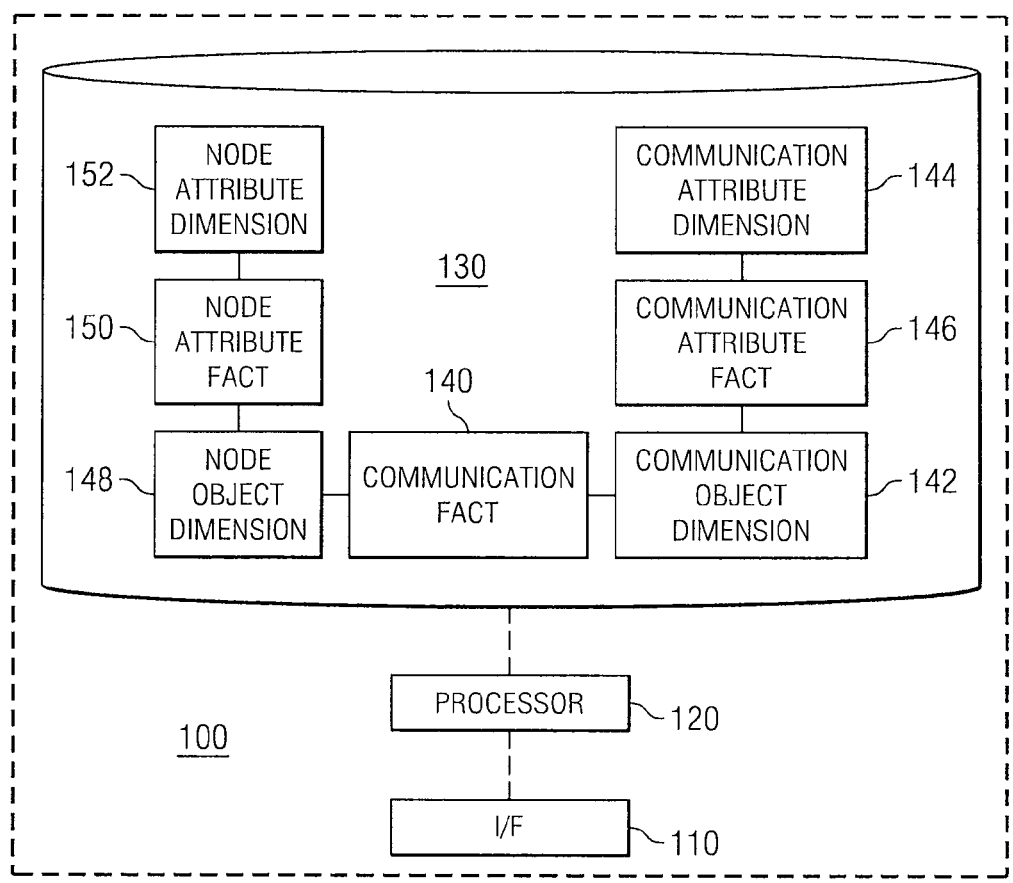
FIG. 2 is a simplified block diagram of an embodiment of a traffic analyzer.

FIG. 2 is a simplified block diagram of an example embodiment of a traffic analyzer 100. As illustrated, traffic analyzer 100 may include an interface 110, a processor 120, and a database 130. Embodiments of traffic analyzer 100 may be similar to traffic analyzer 40 illustrated in FIG. 1.

Interface 110 may communicate information and signals to, and receive information and signals from, a communication network, such as network 20 of FIG. 1. Interface 110 may represent any port or connection, real or virtual, including any suitable hardware and/or software that may allow traffic analyzer 100 to exchange information and signals with components coupled to network 20.

Processor 120 may be coupled to interface 110 and control the operation of traffic analyzer 100. In particular, processor 120 may execute commands and instructions associated with services provided by traffic analyzer 100. Examples of processor 120 include, application-specific integrated circuits (ASICs), field-programmable gate arrays (FGPAs), digital signal processors (DSPs), and any other suitable specific or general purpose processors.

Database 130 may be coupled to processor 120 and may store processor instructions and/or any other appropriate information used by traffic analyzer 100. Examples of database 130 include, but are not limited to, relational databases and object oriented databases. Database 130 may include any suitable type of memory including, for example, random access memory (RAM) devices, dynamic random access memory (DRAM), read only memory (ROM) devices, magnetic storage devices, optical storage devices, flash memory, or any other suitable data storage medium.

As illustrated in FIG. 2, embodiments of database 130 may comprise a communication fact module 140, a communication object dimension module 142, a communication attributes dimension module 144, a communication attributes fact module 146, a node object dimension module 148, node attributes dimension module 150, and a node attributes fact module 152. Although the illustrated embodiment of database 130 includes particular data elements, it should be understood that database 130 may maintain any suitable information for use in the operation of traffic analyzer 100.

Communication fact module 140 may manage and store data associated with a communication or communication session between two nodes. Communication fact module 140 may provide real-time volume and discovery information of any communication observed between or among nodes in a network, such as network 20 of FIG. 1. Embodiments of communication fact module 140 may comprise a communication fact table. Table 1 represents an embodiment of a communication fact table.

TABLE 1

| COMMUNICATION FACT | | | | | |
|---|---|---|---|---|---|
| Source Node ID | Comm ID | Destination Node ID | Volume | Start Time | End Time |
| 1 | 4 | 2 | 234 | 5/27/2008 12:00 | 5/27/2008 13:45 |
| 2 | 2 | 3 | 467 | 5/27/2008 14:34 | 5/27/2008 16:36 |
| 4 | 7 | 5 | 2567 | 5/27/2008 14:36 | 5/27/2008 14:38 |

In some embodiments, the communication fact table may contain entries, for each communication or communication session in a network. Each entry may include one or more fields corresponding to a Source Node ID, a Communication ID, a Destination Node ID, a Volume, a Start Time and an End Time. A Source Node ID may generally be a name, tag, label or other suitable identifier associated with a node that is sending communication data over a network. A Communication ID may be any name, tag, label or other suitable identifier assigned to a communication or communication session between or among one or more nodes. A Destination Node ID may be any name tag, label or other suitable identifier associated with a node that is receiving communication data over a network. Volume may correspond to the number of bytes that was exchanged in a communication or a communication session between a respective source node and destination node. Start Time and End Time may correspond to the time that a communication or communication session commenced and terminated, respectively. More particularly, Start Time may correspond to the time that the first bit of data is sent by the source node and end time may correspond to the time that the last bit of data is either sent by the source node or received by the destination node.

During run-time, the communication fact table may provide a real-time summary of network communications. Accordingly, additional data analysis applications may not be required in order to provide baseline volume information or discovery information including, the time of discovery of each individual node, each relationship, and each communication.

Communication object dimension module 142 may associate a Communication ID with a protocol used by a communication or a communication session. Embodiments of communication object dimension module 142 may comprise a communication object dimension table. TABLE 2 represents an embodiment of a communication object dimension table.

TABLE 2

COMMUNICATION OBJECT DIMENSION

| Comm ID | Protocol Name | Discovery Time |
|---|---|---|
| 1 | SMTP | 05/27/2008 23:56 |
| 2 | FTP | 05/27/2008 14:34 |
| 3 | IMAP | 05/27/2008 9:37 |
| 4 | HTTP | 05/27/2008 12:00 |
| 5 | POP3 | 05/27/2008 13:12 |
| 6 | HTTP | 05/27/2008 17:39 |
| 7 | HTTP | 05/27/2008 14:36 |

In some embodiments, the communication object dimension table may comprise an entry for each communication. Each entry may include fields corresponding to a Communication ID, a Protocol Name, and a Discovery Time. For a given communication or communication session between two nodes, the Communication ID corresponds to a Communication ID in the communication fact table. Protocol Name may correspond to the communication protocol used by the communication or communication session. For example, the protocol may be Hypertext Transfer Protocol (HTTP) for a website query. As another example, the protocol may be Post Office Protocol (POP), Simple Mail Transfer Protocol (SMTP), or Internet Message Access Protocol (IMAP) for e-mail communications. The Discovery Time may correspond to the time that the communication protocol was first discovered by traffic analyzer 100. In particular, Discovery Time may generally correspond to the Start Time for a communication or communication session. Thus, for example, the Discovery Time for the communication having Communication ID 2 and the Start Time for the same communication may both be 5/27/2008-14:34.

Communication attributes dimension module 144 may associate an attribute identification with an attribute name and an attribute value. Embodiments of communication attributes dimension module 144 may comprise a communication attributes dimension table. TABLE 3 is an embodiment of a communication attributes dimension table that may be managed by communication attributes dimension module 144.

TABLE 3

COMMUNICATION ATTRIBUTES DIMENSION

| Comm Attribute ID | Comm Attribute Name | Comm Attribute Value | Discovery Time |
|---|---|---|---|
| 1 | SMTP-Receiver | xyz@msn.com | 5/27/2008 23:56 |
| 2 | SMTP-Sender | abc@msn.com | 5/27/2008 23:56 |
| 3 | FTP-User | srima01 | 5/27/2008 14:34 |
| 4 | FTP-Password | abcdef | 5/27/2008 14:34 |
| 5 | IMAP-User | testuser | 5/27/2008 9:37 |
| 6 | IMAP-Password | testpwd | 5/27/2008 9:37 |
| 7 | WWW | www.cnn.com | 5/27/2008 12:00 |
| 8 | Document | /webmail.js | 5/27/2008 12:00 |
| 9 | POP3-User | pat@yahoo.com | 5/27/2008 13.12 |
| 10 | POP-Password | pop3pwd | 5/27/2008 13:12 |
| 11 | Telnet-User | twfsfg | 5/27/2008 17:39 |

TABLE 3-continued

COMMUNICATION ATTRIBUTES DIMENSION

| Comm Attribute ID | Comm Attribute Name | Comm Attribute Value | Discovery Time |
|---|---|---|---|
| 12 | Telnet-Password | twfspwd | 5/27/2008 17:39 |
| 13 | WWW-Browser | IE | 5/27/2008 12:00 |
| 14 | WWW-Server | Apache | 5/27/2008 12:00 |
| 15 | WWW-Server | IIS5.0 | 5/27/2008 14:36 |
| 16 | WWW-Browser | Netscape | 5/27/2008 14:36 |

According to some embodiments, the communication attributes dimension table may comprises an entry for each communication attribute identified in a network. In general, each entry may include fields for a Communication Attribute ID, a Communication Attribute Name, a Communication Attribute Value, and a Discovery Time. A Communication Attribute ID may represent any name, tag, label or other suitable identifier assigned to an attribute of a communication or communication session. A Communication Attribute Name may correspond to a classification of a type of communication. For example, if a destination node receives a SMTP e-mail message, the Communication Attribute Name may be "SMTP-Receiver." Conversely, if a source node sends a SMTP e-mail message, the Attribute Name may be "SMTP Sender." A Communication Attribute Value may be an identifier associated with the Attribute Name. For example, the Communication Attribute Value for the receiver of a SMTP message may be an e-mail address associated with the destination node (e.g., xyz@msn.com). As another example, the Communication Attribute Value for a WWW browser may be "Netscape" or "IE." A Discovery Time may correspond to the time that an attribute of a communication or communication session is discovered. The Discovery Time for an attribute of a communication in the communication attributes dimension table may correspond to the Start Time in the communication fact table for the communication with which the attribute is associated.

Communication attributes fact module 146 may associate attributes with a communication or a communication session. Embodiments of communication attributes fact module 146 may comprise a communication attributes fact table. TABLE 4 represents an embodiment of a communication attributes fact table.

TABLE 4

COMMUNICATION ATTRIBUTES FACT

| Comm ID | Comm Attribute ID | Discovery Time |
|---|---|---|
| 1 | 1 | 5/27/2008 23:56 |
| 1 | 2 | 5/27/2008 23:56 |
| 2 | 3 | 5/27/2008 14:34 |
| 2 | 4 | 5/27/2008 14:34 |
| 3 | 5 | 5/27/2008 9:37 |
| 3 | 6 | 5/27/2008 9:37 |
| 4 | 7 | 5/27/2008 12:00 |
| 4 | 13 | 5/27/2008 12:00 |
| 4 | 14 | 5/27/2008 12:00 |
| 5 | 9 | 5/27/2008 13:12 |
| 5 | 10 | 5/27/2008 13:12 |
| 6 | 7 | 5/27/2008 17:39 |
| 6 | 13 | 5/27/2008 17:39 |
| 6 | 14 | 5/27/2008 17:39 |
| 7 | 7 | 5/27/2008 14:36 |
| 7 | 15 | 5/27/2008 14:36 |
| 7 | 16 | 5/27/2008 14:36 |

According to some embodiments, a communication attributes fact table may comprise fields for a Communication ID, a Communication Attribute ID, and a Discovery Time. The Communication ID in the communication attributes fact table may generally be associated with a corresponding Communication ID in the communication fact table. The Communication Attribute ID may be associated with the Communication ID and correspond to an entry in the communication attributes dimension table. Accordingly, communication attributes fact module 146 may map or otherwise associates attributes to a communication or a communication session. The Discovery Time may correspond to the time that an attribute is determined to be associated with a communication or communication session. In general, the Discovery Time in the communication attributes fact table will correspond to the Start Time of a communication or communication session in the communication fact table.

Node object dimension module 148 may associate a Node ID with information that logically locates a node within a network. In various embodiments, node object dimension module 148 may associate a node with an IP address, a MAC address, or a Subnet. Embodiments of node object dimension module 148 may comprise a node object dimension table, an example of which is provided in TABLE 5.

TABLE 5

NODE OBJECT DIMENSION

| Node ID | IP Address | MAC Address | Subnet | Discovery Time |
|---|---|---|---|---|
| 1 | 192.168.10.105 | 08-00-20-FE-DD-5E | 192.168.10.0 | 05/27/2008 12:00 |
| 2 | 192.168.10.104 | 18-00-20-FE-DD-5F | 192.168.10.0 | 05/27/2008 12:00 |
| 3 | 192.168.10.105 | 28-00-20-FE-EE-5E | 192.168.10.0 | 05/27/2008 14:34 |
| 4 | 192.168.10.102 | 38-00-30-FE-EE-5E | 192.168.10.0 | 05/27/2008 14:36 |
| 5 | 192.168.10.100 | 48-00-40-FE-EE-5E | 192.168.12.0 | 05/27/2008 14:36 |

The node object dimension table may comprise entries for each identified node in a network. Each entry may include fields for Node IDs, IP Addresses, MAC Addresses, Subnets, and Discovery Times. The node object dimension module 148 may associate a Node ID for a node in a network, such as network 20 of FIG. 1, with information that logically locates the node within the network. For purposes of the node object dimension table, the Discovery Time may correspond to the time at which a node is first discovered. Thus, for example, the Start Time for a communication or a communication session in the communication fact table (TABLE 1) may also be the Discovery Time in the node object dimension table (TABLE 5) for each of the nodes participating in the communication.

Node attributes dimension module 150 may associate attribute properties with an attribute identifier. Embodiments of node attributes dimension module 150 may comprise a node attributes dimension table. TABLE 6 is an example embodiment of a node attributes dimension table.

TABLE 6

NODE ATTRIBUTES DIMENSION

| Node Attribute ID | Node Attribute Name | Node Attribute Value | Discovery Time |
|---|---|---|---|
| 1 | LM-Host | srima01 | 05/27/2008 12:00 |
| 2 | LM-Domain | ca.com | 05/27/2008 12:00 |
| 3 | CPU | PC | 05/27/2008 12:00 |

TABLE 6-continued

NODE ATTRIBUTES DIMENSION

| Node Attribute ID | Node Attribute Name | Node Attribute Value | Discovery Time |
|---|---|---|---|
| 4 | OS | Windows 2003 | 05/27/2008 12:00 |
| 5 | LM-Host | srima02 | 05/27/2008 14:36 |
| 6 | Node Type | Router | 05/27/2008 14:34 |
| 7 | Node Type | NetwareStation | 05/27/2008 14:34 |
| 8 | OS | Windows XP | 05/27/2008 14:36 |
| 9 | Node Type | NetwareNetwork | 05/27/2008 14:34 |

Embodiments of the node attributes dimension table may include entries for each node attribute identified within a network. Each entry may include fields corresponding to a Node Attribute ID, a Node Attribute Name, a Node Attribute Value, and a Discovery Time. Thus, node attribute dimension module 150 may associate Node Attribute Names, Node Attribute Values, and Discovery Times with a Node Attribute ID. Node Attribute IDs may represent any name, tag, label or other suitable identifier assigned to a node attribute. Node Attribute Name may be a feature of a node, such as LAN-Manager Host (LM-Host), LAN-Manager Domain (LM-Domain), Central Processing Unit (CPU), Operating System (OS), or a node type (NodeType). Node Attribute Value may correspond to a property associated with the Node Attribute Name. For example, the Node Attribute Value for the Node Attribute Name LM-Domain may be "ca.com." As another example, the Node Attribute Value for the Node Attribute Name CPU may be Pentium PC (PPC). As a further example, the Node Attribute Name for the Node attribute Value OS may be "Windows 2003" or "Windows XP." For purposes of the node attributes dimension table, the Discovery Time field may correspond to the time at which an attribute is discovered.

Node attributes fact module 152 may associate a node with an attribute. Embodiments of node attributes fact module 152 may comprise a node attributes dimension table. TABLE 7 is an example embodiment of a node attributes fact table.

TABLE 7

NODE ATTRIBUTES FACT

| Node ID | Attribute ID | Discovery Time |
|---|---|---|
| 1 | 1 | 05/27/2008 12:00 |
| 1 | 2 | 05/27/2008 12:00 |
| 1 | 3 | 05/27/2008 12:00 |
| 1 | 4 | 05/27/2008 12:00 |
| 4 | 2 | 05/27/2008 14:36 |
| 4 | 4 | 05/27/2008 14:36 |
| 4 | 8 | 05/27/2008 14:36 |
| 3 | 2 | 05/27/2008 14:34 |
| 3 | 7 | 05/27/2008 14:34 |

Embodiments of the node attributes fact table may comprise fields for a Node ID, a Node Attribute ID, and a Discovery Time. A Node ID may be any name, tag, label or other suitable identifier assigned to a node in a network. The Node ID in the node attributes fact table may generally be associated with a corresponding Node ID in the node object dimension table. Similarly, a Node Attribute ID may be any name, tag, label or other suitable identifier assigned to a node attribute in the node attributes dimension table. The Discovery Time for purposes of the node attributes fact table may be the time that a node is determined to have a particular node attribute. Fields within a row may be associated with each other. As shown in TABLE 7, a node may have multiple node attributes associated with it. In this manner, node attributes fact module 152 may associate a node with one or more node attributes.

In operation, traffic analyzer 100 may analyze and cache information associated with communication traffic in a network. In particular, traffic analyzer 100 may identify nodes communicating in a network and determine relationships between the nodes. As nodes, and relationships between nodes, are identified, the tables in database 130 may be updated with suitable information defining attributes of the nodes and communications. In certain embodiments, traffic analyzer may store the network knowledgebase in memory using one or more Standard Template Library (STL) deque containers which may facilitate high data insertion speeds.

Once all of the nodes in a network are identified, the size of the communication object dimension table, the communication attributes dimension table, the node object dimension table, and the node attributes dimension table may remain constant. The data cached in the node attributes fact table, the communication attributes fact table, and the communication fact table may grow rapidly at first as the network is discovered. After a period of time, the rate of growth of the communication attributes fact table and node attributes fact table may decrease such that the tables cease to grow. The communication fact table may be updated periodically based on network flow. At the end of a data segmentation interval, the cached data in the communication fact table may be flushed. By contrast, the data from the other tables may be retained so that traffic analyzer 100 may determine whether a network attribute (node attribute or communication attribute) or node was previously discovered. The segmented data from the communication fact table may be used to create one or more baselines, by network traffic volume, for an IP address, a MAC address, or a protocol.

Embodiments of traffic analyzer 100 may reduce or eliminate data redundancy associated with monitoring the topology of a network. As discussed, embodiments of traffic analyzer 100 may maintain information regarding previously discovered network entities and may thus avoid recreating relationships among entities. In particular, as the network discovery process evolves, and more of the network is discovered, the amount of new network information that traffic analyzer 100 must analyze decreases. Accordingly, traffic analyzer 100 may avoid unnecessary packet processing because it is aware of previously discovered network entities and does not need to create the same relationships again.

It should be understood that FIG. 2 illustrates a particular embodiment of traffic analyzer 100 that includes a particular number and arrangement of components configured to provide certain functionality. Alternative embodiments may include any appropriate combination of components with the described functionality divided between the components in any suitable manner. Additionally, embodiments of traffic analyzer 100 may include more, fewer, or other components.

Figure 3A:
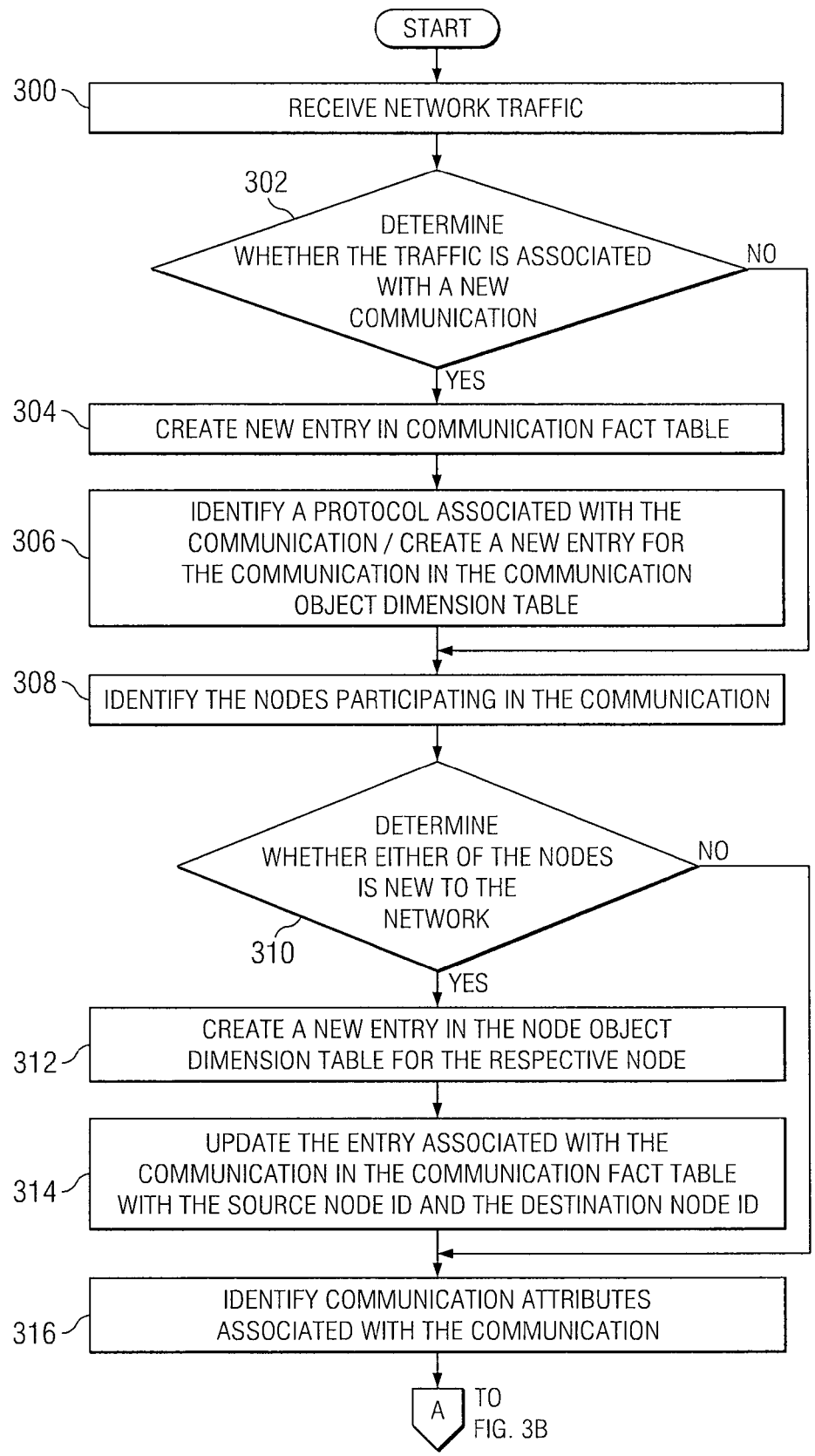
FIGS. 3A-3C (hereinafter referred to as "FIG. 3") are flowcharts illustrating a method for analyzing network traffic in accordance with a particular embodiment.
Figure 3B:
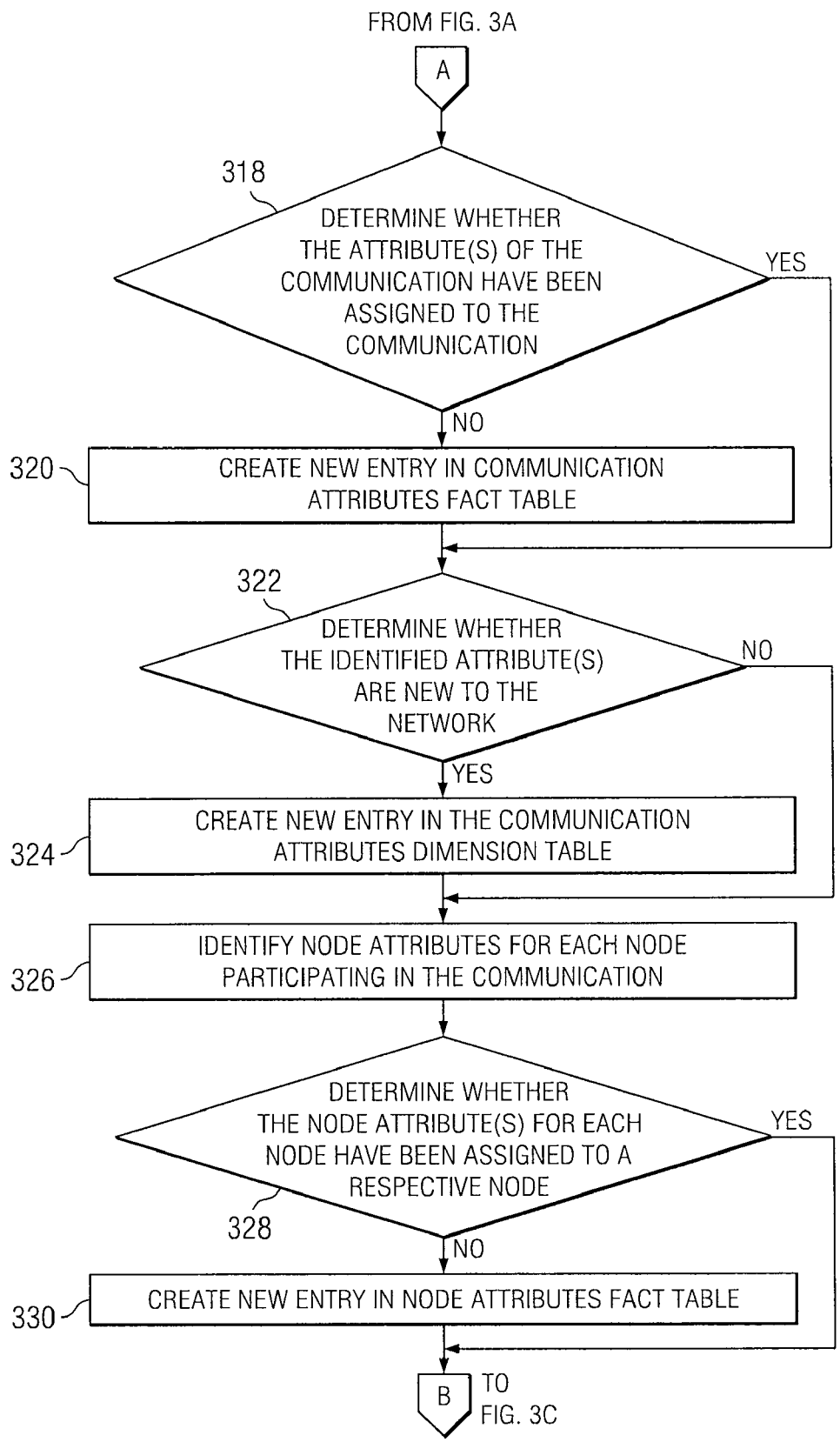
Figure 3C:
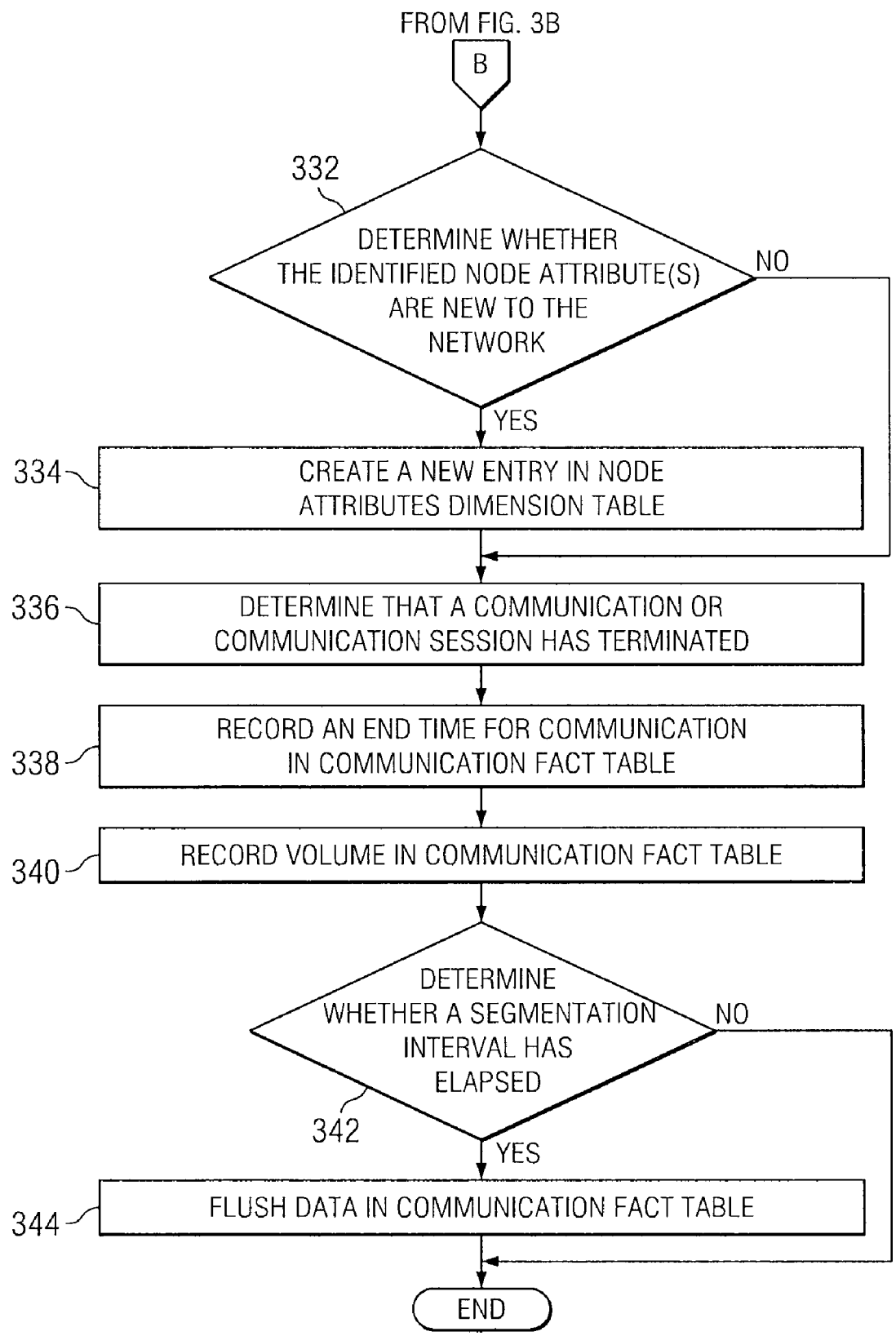

With reference to FIG. 3, a flowchart illustrating a method of operation for traffic analyzer 100 in accordance with a particular embodiment is provided. The method begins at step 300 where network traffic, in the form of one or more data packets, is received. Upon receiving the network traffic, traffic analyzer 100 may determine whether the received traffic is associated with a new communication, at step 302. If the traffic is associated with a new communication, traffic analyzer may create a new entry for the communication in the communication fact table, at step 304. This step may involve, assigning a Communication ID to the communication and entering a Start Time for the communication.

If the traffic is part of a new communication, traffic analyzer 100 may identify a protocol associated with the communication and create a new entry for the communication in the communication object dimension table, at step 306. Prior to, concurrent with, or after step 306, traffic analyzer may also identify the nodes participating in the communication at step 308. This step may involve determining the IP Address, MAC Address, and/or Subnet for the source and destination nodes. At step 310, traffic analyzer 100 may determine whether either of the nodes is new to the network. If either of the nodes is new to the network, traffic analyzer 100 may create a new entry in the node object dimension table for the respective node, at step 312. Step 312, may involve assigning a new Node ID to the node that is new to the network. Next, at step 314, traffic analyzer 100 may update the entry associated with the communication in the communication fact table with the Source Node ID and the Destination Node ID.

Whether or not the traffic is associated with a new communication, traffic analyzer 100 may proceed with determining the attributes of the communication. At step 316, traffic analyzer 100 may identify communication attributes based on information contained in one or more data packets associated with the communication. This step may involve determining one or more Attribute IDs for the attributes. At step 318, traffic analyzer 100 may determine whether the attribute(s) of the communication have been assigned to, or otherwise associated with, the communication. Step 318 may involve parsing the communication attributes fact table to determine whether an Attribute ID for each attribute associated with the communication has been associated with a communication ID for the communication. If the attribute has not previously been associated with the communication, then a new entry may be created in the communication attributes fact table at step 320. Concurrent with, or prior to, step 320, traffic analyzer 100 may determine whether the identified attribute(s) are new to the network at step 322. If the identified attribute(s) are new to the network, then, at step 324, a new entry in the communication attributes dimension table may be created and a new Attribute ID may be assigned to the attribute.

Next, at step 326, traffic analyze 100 may identify node attributes for each node participating in the communication. This step may involve determining one or more Node Attribute IDs for the node attributes. At step 328, traffic analyzer 100 may determine whether the node attribute(s) for each node have been assigned to, or otherwise associated with, the respective node. Step 328 may involve parsing the node attributes fact table to determine whether a Node Attribute ID for each attribute associated with a respective node has been associated with the respective Node ID for the node. If the node attribute has not previously been associated with the node, then a new entry may be created in the node attributes fact table at step 330. Concurrent with, or prior to, step 330 traffic analyzer 100 may determine whether the identified node attribute(s) are new to the network at step 332 (i.e., determine whether the node attributes have been previously identified or associated with any other node in the network). If the identified node attribute(s) are new to the network, then, at step 334, a new entry in the node attributes dimension table may be created and a new Node Attribute ID may be assigned to the node attribute.

At step 336, traffic analyzer 100 may determine that a communication or communication session has terminated. In response to determining that a communication has terminated, traffic analyzer 100 may record an End Time for the communication for the entry associated with the communication in the communication fact table at step 338. At step 340, traffic analyzer 100 may record the volume of data that was transferred during the communication in the entry associated with the communication in the communication fact table. At step 342, traffic analyzer 100 may determine whether a segmentation interval has elapsed. A segmentation interval may be a period of time during which traffic analyzer collects data associated with network communications. A segmentation interval may be pre-determined, random, or user-controlled. If a segmentation interval has elapsed, data in the communication fact table may be flushed at step 344. Data from the other tables may be retained to facilitate the discovery of network communication attributes and nodes during subsequent segmentation intervals.

One skilled in the art will readily recognize that some of the steps illustrated in FIG. 3 may be combined, modified or deleted where appropriate, and additional steps may also be added to the flowchart. Additionally, steps may be performed in any suitable order without departing from the intended scope of the invention.

Further, while the present invention has been described in detail with reference to particular embodiments, it should be understood that various other changes, substitutions, and alterations may be made hereto without departing from the spirit and scope of the present invention. Numerous other changes, substitutions, variations, and modifications may be ascertained by those skilled in the art and it is intended that the present invention encompass all such changes, substitutions, variations, and modifications as falling within the spirit and scope of the appended claims.

What is claimed is:

1. A system for caching network traffic, comprising:
   an interface configured to receive traffic from a plurality of nodes communicating in a network;
   a processor coupled to the interface and configured to identify each of the plurality of nodes communicating in the network;
   a database comprising:
      a node object dimension table, the node object dimension table comprising an entry for each identified node, each entry in the node object dimension table comprising a node identification and an address for locating the node in the network;
      a communication fact table, the communication fact table comprising an entry for each communication in the network, each entry in the communication fact table comprising:
         a source node identification, the source node identification comprising the node identification for a source node;
         a communication identification;
         a destination node identification, the destination node identification comprising the node identification for a destination node;
      a communication object dimension table, the communication object dimension table comprising an entry for each communication in the network, each entry in the communication object dimension table comprising:
         the communication identification; and
         a protocol name associated with the communication identification; and
      a communication attributes dimension table, the communication attributes dimension table comprising an entry for each communication attribute identified in the network and wherein each communication attribute is associated with at least one communication identification,
   wherein the processor is configured to:
   determine that a segmentation interval has elapsed; and
   flush data in a communication fact table, the communication fact table comprising a record of each communication identified during the segmentation interval.

2. The system of claim 1, wherein:
   the processor is further configured to identify one or more communication attributes associated with each communication in the network; and
   each entry in the communication attributes dimension table comprises:
      an attribute identification;
      an attribute name; and
      an attribute value.

3. The system of claim 2, wherein the database further comprises a communication attributes fact table, the communication attributes fact table comprising an entry for each communication attribute associated with a particular communication, each entry in the communication attributes fact table comprising:
   the communication identification; and
   the attribute identification.

4. The system of claim 1, wherein:
   the processor is further configured to identify one or more node attributes associated with each identified node in the network; and
   the database further comprises a node attributes dimension table, the node attributes dimension table comprising an entry for each node attribute identified in the network, wherein each entry in the node attribute dimension table comprises:
   a node attribute identification;
   a node attribute name; and
   a node attribute value.

5. The system of claim 4, wherein the database further comprises a node attributes fact table, the node attributes fact table comprising an entry for each node attribute associated with a particular node, each entry in the node attributes fact table comprising:
   a node identification; and
   a node attributes identification.

6. A system for caching network traffic, comprising:
   an interface configured to receive traffic from a plurality of nodes communicating in a network;
   a processor coupled to the interface and configured to identify each of the plurality of nodes communicating in the network;
   a database comprising:
      a node object dimension table, the node object dimension table comprising an entry for each identified node, each entry in the node object dimension table comprising a node identification and an address for locating the node in the network,
      a communication fact table, the communication fact table comprising an entry for each communication in the network, each entry in the communication fact table comprising:
         a source node identification, the source node identification comprising the node identification for the source node;
         a communication identification; and
         a destination node identification, the destination node identification comprising the node identification for the destination node;
   wherein an address for locating the node in the network comprises an Internet Protocol (IP) address, and a communication attributes dimension table, the communication attributes dimension table comprising an entry for each communication attribute identified in the network and wherein each communication attribute is associated with at least one communication identification, wherein the processor is configured to:

determine that a segmentation interval has elapsed; and flush data in a communication fact table, the communication fact table comprising a record of each communication identified during the segmentation interval.

7. A computer readable medium comprising computer code for caching network traffic, the computer code when executed being operable to:

determine whether network traffic is associated with a new communication, the new communication being a communication not previously identified in the network;

in response to determining that the network traffic is associated with a new communication:

assign a communication identification to the new communication;

create a new entry associated with the new communication in a communication fact table, the new entry in the communication fact table comprising the communication identification;

identify a communication protocol associated with the new communication; and create a new entry in a communication object dimension table, the new entry in the communication object dimension table comprising the communication identification for the new communication and a communication protocol identification for the protocol associated with the new communication;

determine whether the new communication has terminated;

in response to determining that the new communication has terminated, input the time corresponding to the time that the new communication was terminated into the entry in the communication fact table associated with the new communication; and identify one or more communication attributes associated with a communication, wherein each communication is associated with at least one communication attribute;

determine that a segmentation interval has elapsed; and flush data in a communication fact table, the communication fact table comprising a record of each communication identified during the segmentation interval.

8. The computer-readable medium of claim 7, wherein the code, when executed, is further operable to:

identify an address of a node that sent the new communication;

identify an address of a node that is to receive the new communication; and determine whether the node that sent the new communication is new to the network;

determine whether the node that is to receive the new communication is new to the network; and if either the node that sent the new communication or the node that is to receive the new communication is new to the network:

assign a node identification to the node that is new to the network; and create a new entry in a node object dimension table, the new entry in the node object dimension table comprising:

the node identification; and the address of the node that is new to the network.

9. The computer-readable medium of claim 7, wherein the code, when executed, is further operable to:

determine whether the one or more communication attributes associated with the communication have been previously identified in the network; and if one or more of the communication attributes associated with the communication have not been previously identified in the network:

assign an attribute identification to each of the one or more communication attributes that have not been previously identified in the network; and create a new entry in a communication attributes dimension table for each of the one or more communication attributes that have not been previously identified in the network, each entry in the communication attributes dimension table comprising:

the attribute identification for the communication; and an attribute name.

10. The computer-readable medium of claim 7, wherein the code, when executed, is further operable to:

determine one or more communication attributes associated with a communication, each of the communication attributes associated with an attribute identification; and for each of the communication attributes associated with the communication, create an entry in a communication attributes fact table, each entry in the communication attributes fact table comprising an attribute identification and a communication identification associated with the node that sent the communication.

11. The computer-readable medium of claim 7, wherein the code, when executed, is further operable to:

determine one or more node attributes associated with a node that sent a communication, each of the node attributes associated with a node attribute identification; and for each of the node attributes associated with the node that sent the communication, create an entry in a node attributes fact table, each entry in the node attributes fact table comprising a node attribute identification and a node identification associated with the node that sent the communication.

12. The computer-readable medium of claim 11, wherein the code, when executed, is further operable to retrieve a node attribute identification for each node attribute associated with the node that sent the communication from a node attributes dimension table.

13. A method for caching network comprising:

receiving traffic associated with a plurality of communications in a network;

determining whether a communication of the plurality of communications is associated with a new communication, the new communication being a communication not previously identified in the network;

in response to determining that a communication of the plurality of communications is not associated with a new communication:

identifying one or more communication attributes associated with the communication;

determining whether the one or more communication attributes associated with the communication have been previously identified in the network; and if one or more of the communication attributes associated with the communication have not been previously identified in the network:

assign an attribute identification to each of the one or more communication attributes that have not been previously identified in the network;

create a new entry in a communication attributes dimension table for each of the one or more communication attributes that have not been previously identified in the network, each entry in the communication attributes dimension table comprising:

the attribute identification for the communication; and an attribute name;

determining that a segmentation interval has elapsed; and flushing data in a communication fact table, the communication fact table comprising a record of each communication identified during the segmentation interval.

14. The method of claim 13, further comprising, in response to determining that a communication of the plurality of communications is associated with a new communication:

assigning a communication identification to the new communication;

creating a new entry associated with the communication in a communication fact table, the new entry in the communication fact table comprising the communication identification.

15. The method of claim 13, further comprising:

determining one or more node attributes associated with a node that is to receive a communication of the plurality of communications, each of the node attributes associated with a node attribute identification; and for each of the node attributes associated with the node that is to receive the communication, create an entry in a node attributes fact table, each entry in the node attributes fact table comprising a node attribute identification and a node identification associated with the node that is to receive the communication.

16. The method of claim 13, further comprising in response to determining that a communication of the plurality of communications is associated with a new communication:

identifying an address of a node that sent the communication;

identifying an address of a node that is to receive the new communication; and creating a new entry associated with the communication in a communication fact table, the new entry comprising:

the address of the node that sent the communication; and the address of the node that is to receive the communication.

* * * * *